United States Patent [19]

Markovich et al.

[11] Patent Number: 5,723,507

[45] Date of Patent: Mar. 3, 1998

[54] FORMED GASKETS MADE FROM HOMOGENEOUS OLEFIN POLYMERS

[75] Inventors: Ronald P. Markovich, Houston; Alan R. Whetten, Lake Jackson, both of Tex.

[73] Assignee: The Dow Chemical Company, Midland, Mich.

[21] Appl. No.: 615,549

[22] Filed: Mar. 11, 1996

[51] Int. Cl.$^6$ ................................................ C08J 9/34
[52] U.S. Cl. ..................... 521/51; 521/79; 521/142; 521/143
[58] Field of Search ........................ 521/142, 143, 521/79, 51

[56] References Cited

U.S. PATENT DOCUMENTS

| | | | |
|---|---|---|---|
| 3,183,144 | 5/1965 | Caviglia | 161/252 |
| 3,300,072 | 1/1967 | Caviglia | 215/40 |
| 3,414,938 | 12/1968 | Caviglia | 18/5 |
| 3,493,453 | 2/1970 | Ceresa et al. | 156/293 |
| 3,645,992 | 2/1972 | Elston | 260/80.78 |
| 3,779,965 | 12/1973 | Lefforge et al. | 260/28.5 |
| 3,786,954 | 1/1974 | Shull | 215/40 |
| 4,076,698 | 2/1978 | Anderson et al. | 526/348.6 |
| 4,085,186 | 4/1978 | Rainer | 264/268 |
| 4,091,136 | 5/1978 | O'Brien et al. | 521/51 |
| 4,186,068 | 1/1980 | Rubens | 521/143 |
| 4,363,849 | 12/1982 | Paisley et al. | 521/51 |
| 4,529,740 | 7/1985 | Trainor | 521/139 |
| 4,619,848 | 10/1986 | Knight et al. | 428/35 |
| 5,272,236 | 12/1993 | Lai et al. | 526/127 |
| 5,278,272 | 1/1994 | Lai et al. | 526/348 |

FOREIGN PATENT DOCUMENTS

96/20878  11/1996  WIPO ............... B65D 41/04

*Primary Examiner*—Morton Foelak

[57] ABSTRACT

Foamed gaskets comprising at least one homogeneously branched ethylene polymer and at least one blowing agent are disclosed. The gaskets are particularly useful for sealing food and liquid containers and do not contribute to taste and/or odor of the packaged product, which is especially useful in food-stuff applications.

8 Claims, No Drawings

FORMED GASKETS MADE FROM HOMOGENEOUS OLEFIN POLYMERS

CROSS REFERENCE TO RELATED APPLICATIONS

This application is related to application Ser. No. 08/108,856 filed Aug. 18, 1993 (now abandoned), to pending application Ser. No. 08/312,014 filed Sep. 23, 1994, to application Ser. No. 08/108,855 filed Aug. 18, 1993 (now abandoned), to pending application Ser. No. 08/392,287 filed Feb. 22, 1995, to U.S. Pat. No. 5,272,236, to U.S. Pat. No. 5,278,272, to U.S. Pat. No. 5,340,840 and to U.S. Pat. No. 5,288,762 the disclosure of each of which is incorporated herein by reference.

FIELD OF THE INVENTION

This invention relates to foamed gaskets made from homogeneously branched olefin polymers, especially novel elastic substantially linear olefin polymers. The gaskets are capable of compression sealing various containers, without contaminating the contents. Liquid containers particularly benefit from the use of the novel gasketing materials disclosed herein.

BACKGROUND OF THE INVENTION

Gaskets have been made from a variety of structural materials, including polymers such as ethylene/vinyl acetate (EVA) and polyvinyl chloride (PVC). For example, U.S. Pat. No. 4,984,703 (Burzynski) discloses plastic closures which have a sealing liner comprising a blend of ethylene/vinyl acetate and a thermoplastic elastomeric composition.

Depending on the use environment, gaskets can have varying degrees of properties. For example, in corrosive service conditions, the gasket must be impervious to the material in question, but still resilient enough to form a seal. Gaskets used in the food and beverage area have similar requirements, but cannot contaminate the foodstuff. Furthermore, depending upon the type of food and/or liquid contents, the filling temperature might be lower or higher than room temperature, thus placing greater demands on the gasket.

Various attempts to solve these challenges usually involve the use of oil additives or elastomer additives.

For example, U.S. Pat. No. 5,137,164 (Bayer), the disclosure of which is incorporated herein by reference, discloses a method of lining a plastic closure to with a thermoplastic. The thermoplastic is a non-cross linked curable, vinyl chloride copolymer composition which has been plasticized with an epoxidized oil, an organic diglycidyl ether and a curing agent for the ether.

U.S. Pat. No. 4,807,772 (Schloss) and U.S. Pat. No. 4,846,362 (Schloss), the disclosure of each of which is incorporated herein by reference, disclose polypropylene and polyethylene closures, respectively, each having removable liners made from a blend of polyethylene and a thermoplastic, elastomeric copolymer (such as a block copolymer of styrene and butadiene). The blends are said to generally include 20–50 weight percent oil.

U.S. Pat. No. 4,872,573 (Johnson et al.), the disclosure of which is incorporated herein by reference, discloses barrier layers for closures selected from the group consisting of ethylene/vinyl alcohol copolymers and polyvinylidene chloride, especially for retarding oxygen containing gases' migration.

U.S. Pat. No. 5,000,992 (Kelch), the disclosure of which is incorporated herein by reference, discloses a plastic container closure made from a coextruded multilayer foamed film. The film has at least one solid layer of a polyethylene blend and at least one foamed layer of a second polyethylene blend. The polyethylene blends can be blends of linear low density polyethylene (LLDPE) and low density polyethylene (LDPE). This type of a liner is co-extruded using a blown film or cast film process, unlike the process disclosed and claimed herein. The polymer blend (foamed & unfoamed layers) is used to laminate to other materials such as polyester or metallic films.

U.S. Pat. No. 3,786,954 (Shull), the disclosure of which is incorporated herein by reference, discloses laminated gaskets comprising a combination of a thick foamed polyethylene sheet material and a thin air and moisture impervious SARAN™ (trademark of and made by The Dow Chemical Company) layer adhered to the polyethylene by a low density polyethylene (LDPE) bond.

U.S. Pat. No. 5,104,710 (Knight), the disclosure of which is incorporated herein by reference, discloses improvement of gasket adhesion through use of propylene adhesion promoters. Knight also discloses a linear low density polyethylene (LLDPE) as a comparison example and shows that it has insufficient bond temperature of 200° C.

U.S. Pat. No. 4,529,740 (Trainor), the disclosure of which is incorporated herein by reference, discloses foamable structures made from elastomers such as styrene-butadiene block copolymers, a small amount of a salt of a sulfonated styrene polymer, and a blowing agent.

U.S. Pat. No. 4,744,478 (Hahn), the disclosure of which is incorporated herein by reference, discloses a molded closure comprising at least one substantially unfoamed polymer layer and an integrally molded foamed layer of the same polymer. The polymer can be olefins, styrenics, polyesters, polycarbonates, or other suitable engineering resins. A preferred polymer is a copolymer of propylene and EDPM rubber.

Polyvinyl chloride (PVC) polymers have also been used extensively as food closure gaskets, but these are increasingly coming under environmental pressures. Other polymers have also been used for their softness qualities, such as ethylene/methacrylic acid or ethylene/acrylic acid copolymers, but these often times contribute negatively to taste and odor problems, since the polymeric gasket comes in contact with the food and certain polymeric constituents leach into the food.

Higher density polyethylene (HDPE) also has been disclosed as useful for forming gaskets, since the higher density polyethylene has relatively good taste and odor properties, but has not been commercially successful to date, because the polymer is too "hard" and because by adding oil to reduce the hardness, the extractables increase, thus negating regulatory requirements for food contact. In addition, while heterogeneous linear low density polyethylene (LLDPE) has better softness properties than HDPE, this LLDPE does not adhere well to certain plastic closures (e.g., polypropylene, which is often used as a closure material, as described in U.S. Pat. No. 4,807,772) resulting in a loose polyethylene gasket. Further, this heterogeneous LLDPE, depending on the polymer's density, can also adversely affect taste and odor.

While there have been many different solutions to the problems of gasketing materials, most of these incorporated additives causing other problems. We have now discovered foamed homogeneously branched linear or foamed homogeneously branched substantially linear ethylene polymers useful in making gasket materials, without additives and, in the case of foodstuff, without adversely contributing to the taste and/or odor of the product.

SUMMARY OF THE INVENTION

Foamed gaskets comprising at least one blowing agent, and at least one homogeneously branched linear or homogeneously branched substantially linear olefin polymer have now been discovered to have these often conflicting attributes. The homogeneously branched olefin polymers have an unusual combination of properties, making them especially useful for gasket materials. Preferably, the homogeneously branched olefin polymer is an ethylene polymer and more preferably, an ethylene/alpha-olefin copolymer.

The homogeneously branched substantially linear ethylene polymers have the processability similar to highly branched low density polyethylene (LDPE), but the strength and toughness of linear low density polyethylene (LLDPE). However, the homogeneously branched substantially linear olefin polymers are distinctly different from traditional Ziegler polymerized heterogeneous polymers (e.g., LLDPE) and are also different from traditional free radical/high pressure polymerized highly branched LDPE. Surprisingly, the novel substantially linear olefin polymers are also different from linear homogeneous olefin polymers having a uniform branching distribution.

The substantially linear ethylene polymers are characterized as having various properties, alone or in combination:

a) a melt flow ratio, $I_{10}/I_2, \geq 5.63$, b) a molecular weight distribution, $M_w/M_n$, defined by the equation:

$$M_w/M_n \leq (I_{10}/I_2) - 4.63, \text{ and}$$

c) a critical shear stress at onset of gross melt fracture greater than $4 \times 10^6$ dyne/cm$^2$, d) a critical shear rate at onset of surface melt fracture at least 50 percent greater than the critical shear rate at the onset of surface melt fracture of a linear ethylene polymer having about the same $I_2$, density, and $M_w/M_n$, and/or e) a processing index (PI) less than or equal to about 70 percent of the PI of a comparative linear ethylene polymer at about the same $I_2$, density, and $M_w/M_n$.

Gaskets comprising elastic substantially linear ethylene polymers are especially preferred. A complete olefinic system (such as a foamed gasket comprising the substantially linear ethylene polymer and a cap comprising a polyethylene or polypropylene polymer) can also be recycled together. Potential uses of the recycled polymers include melt spinning biconstituent fiber, as described in U.S. Pat. No. 5,133,917 (Jezic et al.), the disclosure of which is incorporated herein by reference.

DETAILED DESCRIPTION OF THE INVENTION

The term "linear ethylene polymers" used herein means that the ethylene polymer does not have long chain branching. That is, the linear ethylene polymer has an absence of long chain branching, as for example the traditional heterogeneous linear low density polyethylene polymers or linear high density polyethylene polymers made using Ziegler polymerization processes (e.g., U.S. Pat. No. 4,076,698 (Anderson et al.), the disclosure of which is incorporated herein by reference), sometimes called heterogeneous polymers. The Ziegler polymerization process, by its catalytic nature, makes polymers which are heterogeneous, i.e., the polymer has several different types of branching within the same polymer composition as a result of numerous metal atom catalytic sites. In addition, the heterogeneous polymers produced in the Ziegler process also have broad molecular weight distributions (MWD); as the MWD increases, the $I_{10}/I_2$ ratio concurrently increases.

The term "linear ethylene polymers" does not refer to high pressure branched polyethylene, ethylene/vinyl acetate copolymers, or ethylene/vinyl alcohol copolymers which are known to those skilled in the art to have numerous long chain branches. The term "linear ethylene polymers" can refer to polymers made using uniform branching distribution polymerization processes, sometimes called homogeneous polymers. Such uniformly branched or homogeneous polymers include those made as described in U.S. Pat. No. 3,645,992 (Elston), the disclosure of which is incorporated herein by reference, and those made using so-called single site catalysts in a batch reactor having relatively high olefin concentrations (as described in U.S. Pat. No. 5,026,798 (Canich) or in U.S. Pat. No. 5,055,438 (Canich), the disclosures of which are incorporated herein by reference) or those made using constrained geometry catalysts in a batch reactor also having relatively high olefin concentrations (as described in U.S. Pat. No. 5,064,802 (Stevens et al.), the disclosure of which is incorporated herein by reference, or in EPA 0 416 815 A2 (Stevens et al.)). The uniformly branched/homogeneous polymers are those polymers in which the comonomer is randomly distributed within a given interpolymer molecule and wherein substantially all of the interpolymer molecules have the same ethylene/comonomer ratio within that interpolymer, but these polymers too have an absence of long chain branching, as, for example, Exxon Chemical has taught in their February 1992 Tappi Journal paper.

The term "substantially linear" polymers means that the polymer has long chain branching and that the polymer backbone is substituted with 0.01 long chain branches/1000 carbons to 3 long chain branches/1000 carbons, more preferably from 0.01 long chain branches/1000 carbons to 1 long chain branches/1000 carbons, and especially from 0.05 long chain branches/1000 carbons to 1 long chain branches/1000 carbons. Similar to the traditional linear homogeneous polymers, the substantially linear ethylene/α-olefin copolymers used in this invention also have a homogeneous branching distribution and only a single melting point, as opposed to traditional Ziegler polymerized heterogeneous linear ethylene/cc-olefin copolymers which have two or more melting points (determined using differential scanning calorimetry (DSC)). The substantially linear ethylene polymers are described in U.S. Pat. No. 5,272,236 and U.S. Pat. No. 5,278,272, the disclosures of which are incorporated herein by reference.

Long chain branching for the substantially linear ethylene polymers is defined herein as a chain length of at least 6 carbons, above which the length cannot be distinguished using $^{13}C$ nuclear magnetic resonance spectroscopy. The long chain branch of the substantially linear ethylene polymers is, of course, at least one carbon longer than two carbons less than the total length of the comonomer copolymer fed with ethylene. For example, in an ethylene/1-octene substantially linear polymer, the long chain branch will be at least seven carbons in length. However, the long chain branch can be as long as about the same length as the length of the polymer back-bone. For substantially linear ethylene/alpha-olefin copolymers, the long chain branch is also itself homogeneously branched, as is the backbone to which the branch is attached.

The SCBDI (Short Chain Branch Distribution Index) or CDBI (Composition Distribution Branch (Breadth) Index) is defined as the weight percent of the polymer molecules having a comonomer content within 50 percent of the median total molar comonomer content. The CDBI of a polymer is readily calculated from data obtained from techniques known in the art, such as, for example, temperature rising elution fractionation (abbreviated herein as "TREF") as described, for example, in Wild et al. *Journal of Polymer Science, Poly. Phys. Ed., Vol.* 20, p. 441 (1982), or as described in U.S. Pat. No. 4,798,081, the disclosure of which is incorporated herein by reference. The SCBDI or CDBI for the homogeneously branched linear or homogeneously branched substantially linear olefin polymers of the present invention is greater than about 50 percent, preferably greater than about 80 percent, and especially greater than about 90 percent.

The density of the homogeneously branched linear or homogeneously branched substantially linear ethylene or ethylene/α-olefin polymers used in the present invention is measured in accordance with ASTM D-792 and is generally from about 0.85 g/cm$^3$ to about 0.93 g/cm$^3$, preferably from about 0.895 g/cm$^3$ to about 0.92 g/cm$^3$, and especially from about 0.895 g/cm$^3$ to about 0.915 g/cm$^3$.

The density is obviously related to the amount of comonomer incorporated into the polymer; the higher the comonomer incorporated, the lower the density. The Food and Drug Administration (FDA) currently limits hexane extractables for polyethylene for food contact to not more than 5.5 %. The method is described in FDA regulation 21 CFR Ch. 1 (4-1-94 Edition) §177.1520, pages 252–253. Even though molecular weight distribution influences hexane extractables, larger amounts of comonomer, especially for heterogeneous polyethylene copolymers, causes higher levels of hexane extractables. For example, heterogeneous ethylene/1-octene linear polyethylene having densities from about 0.9017 to about 0.91 g/cm$^3$ generally have hexane extractables greater than 5%. In contrast, for example, a homogeneous substantially linear ethylene/1-octene copolymer having a density at least as low as about 0.8976 g/cm$^3$ and a melt index of about 1 g/10 minutes, has hexane extractables less than 5%, preferably less than about 2% and especially less than about 1%.

Melting point (and Vicar softening point) of the substantially linear ethylene polymers correlates primarily with the density of the polymer since the substantially linear ethylene polymers lack a high density (i.e., linear) fraction, with some effects attributable to the molecular weight of the polymer (indicated melt index). Melting point variation of the substantially linear ethylene polymers is contrasted with heterogeneous ethylene polymers having two or more melting points (due to their broad branching distribution), one of which is about 126° C. and is attributable the high density linear polyethylene fraction. The lower the density of the substantially linear ethylene polymer, the lower the melting point. For example, Table 1 lists Vicat softening point (as measured using ASTM D-1525) versus density for various substantially linear ethylene/1-octene copolymers:

TABLE 1

| Density (gm/cm$^3$) | Vicat Softening Point (°C.) |
|---|---|
| 0.939 | 125 |
| 0.922 | 100 |

TABLE 1-continued

| Density (gm/cm$^3$) | Vicat Softening Point (°C.) |
|---|---|
| 0.903 | 84 |
| 0.886 | 63 |
| 0.884 | 58 |
| 0.872 | 44 |

Some gaskets must withstand temperatures higher than room temperature (about 25° C.) for brief times, particularly where the application is a "hot fill" application. For example, products which must undergo pasteurization must have gaskets that have melting points greater than 100° C. Thus the substantially linear ethylene polymer can be selected specifically for the application in question by selecting the appropriate density for use in the gasket environment.

The molecular weight of the homogeneously branched linear or homogeneously branched substantially linear ethylene or ethylene/α-olefin polymers used in the present invention is conveniently indicated using a melt index measurement according to ASTM D-1238, Condition 190° C./2.16 kg (formally known as "Condition (E)" and also known as $I_2$). Melt index is inversely proportional to the molecular weight of the polymer. Thus, the higher the molecular weight, the lower the melt index, although the relationship is not linear. The melt index for the ethylene or ethylene/α-olefin homogeneously branched linear or homogeneously branched substantially linear olefin polymers used herein is generally from about 0.01 grams/10 minutes (g/10 min) to about 1000 g/10 min, preferably from about 1 g/10 rain to about 100 g/10 rain, and especially from about 3 g/10 min to about 50 g/10 min. Molecular weight, as indicated by the melt index, will be dependent upon the shear rate necessary to process the polymer into the gasket.

Another measurement useful in characterizing the molecular weight of the homogeneously branched linear or homogeneously branched substantially linear olefin polymers is conveniently indicated using a melt index measurement according to ASTM D-1238, Condition 190° C./10 kg (formerly known as "Condition (N)" and also known as $I_{10}$). The ratio of these two melt index terms is the melt flow ratio and is designated as $I_{10}/I_2$. For the substantially linear ethylene/α-olefin polymers of the invention, the $I_{10}/I_2$ ratio indicates the degree of long chain branching, i.e., the higher the $I_{10}/I_2$ ratio, the more long chain branching in the polymer. Generally, the $I_{10}/I_2$ ratio of the substantially linear ethylene/α-olefin polymers is at least about 5.63, preferably at least about 7, especially at least about 8 or above. The upper limit of the $I_{10}/I_2$ ratio can be about 50, preferably about 20, and especially about 15.

For gaskets made from the preferred substantially linear ethylene polymers, the melt flow ratio ($I_{10}/I_2$) can be increased to compensate for the use of higher molecular weight polymers (i.e., lower melt index polymers). Other elastic properties of the homogeneously branched substantially linear ethylene polymers are also important, especially when the gasket is a closure liner, where higher amounts of long chain branching yields lower viscoelastic recovery (more inelastic), such that the polymer, when plunged into a closure, will adhere to the closure, rather than "bounce" out of the closure during fabrication.

Other polymers can also be combined with effective amounts of the homogeneously branched linear or homogeneously branched substantially linear ethylene polymers to make the gaskets as well, depending upon the end use properties required. These other polymers are thermoplastic polymers (i.e., melt processable) and include polymers such as highly branched low density polyethylene, heterogeneously branched linear low density polyethylene, ethylene/vinyl acetate copolymers, ethylene/ alpha-olefin/diene ("EPDM") interpolymers, thermoplastic vulcanizates ("TPV's") (e.g., EPDM blended with polypropylene cured by using sulfur or peroxide curing agents), thermoplastic rubbers, such as styrene/butadiene rubber (e.g., KRATON* made by Shell Oil Company) and ethylene/acrylic acid copolymers (e.g., PRIMACOR™ Adhesive Polymers made by The Dow Chemical Company). Oil may also be added, depending on the end use.

The gaskets made from the homogeneously branched linear or homogeneously branched substantially linear ethylene polymers must be hard enough to withstand compression, but still soft enough such that an adequate seal is formed. Thus, the hardness of the polymer enables varying gaskets to be made, depending on the use. Hardness is measured herein as "Shore A" hardness (as determined using ASTM D-2240). For the homogeneously branched linear or homogeneously branched substantially linear ethylene polymers which comprise the gaskets, the Shore A hardness ranges from about 70 to about 100, even without the use of petroleum oils commonly included to reduce the hardness of the polymer and resulting gasket. For the foamed gaskets made herein, the Shore A ranges from about 40 to about 95. Table 2 summarizes Shore A data versus polymer density for substantially linear ethylene/1-octene copolymers used to make gaskets:

TABLE 2

| Polymer Density (g/cm$^3$) | Shore A Hardness |
|---|---|
| 0.87 | 73 |
| 0.871 | 75 |
| 0.884 | 85 |
| 0.886 | 87 |
| 0.902 | 93 |
| 0.908 | 95 |
| 0.912 | 95 |
| 0.922 | 96 |
| 0.94 | 97 |

Additives such as antioxidants (e.g., hindered phenolics (e.g., Irganox® 1010 made by Ciba Geigy Corp.), phosphites (e.g., Irgafos® 168 made by Ciba Geigy Corp.)), cling additives (e.g., PIB), slip additives (e.g., erucamide), antiblock additives, pigments, and the like can also be included in the homogeneously branched linear or homogeneously branched substantially linear polyethylene compositions, to the extent that they do not interfere with the enhanced properties discovered by Applicants.

Molecular Weight Distribution Determination

The whole interpolymer product samples and the individual interpolymer samples are analyzed by gel permeation chromatography (GPC) on a Waters 150 C. high temperature chromatographic unit equipped with three mixed porosity columns (Polymer Laboratories 10$^3$, 10$^4$, 10$^5$, and 10$^6$), operating at a system temperature of 140° C. The solvent is 1,2,4-trichlorobenzene, from which 0.3 percent by weight solutions of the samples are prepared for injection. The flow rate is 1.0 milliliters/minute and the injection size is 200 microliters.

The molecular weight determination is deduced by using narrow molecular weight distribution polystyrene standards (from Polymer Laboratories) in conjunction with their elution volumes. The equivalent polyethylene molecular weights are determined by using appropriate Mark-Houwink coefficients for polyethylene and polystyrene (as described by Williams and Ward in *Journal of Polymer Science, Polymer Letters*, Vol. 6, (621) 1968) to derive the following equation:

$$M_{polyethylene} = a * (M_{polystyrene})^b.$$

In this equation, a=0.4316 and b=1.0. Weight average molecular weight, $M_w$, is calculated in the usual manner according to the following formula: $M_w = \Sigma w_i * M_i$, where $w_i$ and $M_i$ are the weight fraction and molecular weight, respectively, of the i$^{th}$ fraction eluting from the GPC column.

The molecular weight distribution ($M_w/M_n$) for the homogeneously branched linear or homogeneously branched substantially linear olefin polymers used in the invention is generally less than about 5, preferably from about 1.5 to about 2.5, and especially from about 1.7 to about 2.3.

Processing Index Determination

The theological processing index (PI) is measured by a gas extrusion rheometer (GER). The GER is described by M. Shida, R. N. Shroff and L. V. Cancio in Polym. Eng. Sci., Vol. 17, no. 11, p. 770 (1977), and in "Rheometers for Molten Plastics" by John Dealy, published by Van Nostrand Reinhold Co. 0982) on page 97–99. The processing index is measured at a temperature of 190° C., at nitrogen pressure of 2500 psig using a 0.0296 inch (752 micrometers) diameter, 20:1 L/D die having an entrance angle of 180°. The GER processing index is calculated in millipoise units from the following equation:

$$PI = 2.15 \times 10^6 \text{ dynes cm}^2/(1000 \times \text{shear rate}),$$

where: $2.15 \times 10^6$ dynes/cm$^2$ is the shear stress at 2500 psi, and the shear rate is the shear rate at the wall as represented by the following equation:

$$32 \, Q'/(60 \text{ sec/min})(0.745)(\text{Diameter} \times 2.54 \text{ cm/in})^3,$$

where:
Q' is the extrusion rate (gm/min),
0.745 is the melt density of polyethylene (gm/cm$^3$), and
Diameter is the orifice diameter of the capillary (inches).
The PI is the apparent viscosity of a material measured at apparent shear stress of $2.15 \times 10^6$ dyne/cm$^2$.

For the substantially linear ethylene polymers used herein, the PI is less than or equal to 70 percent of that of a comparative linear ethylene polymer at about the same I$_2$ and $M_w/M_n$.

An apparent shear stress vs. apparent shear rate plot is used to identify the melt fracture phenomena. According to Ramamurthy in *Journal of Rheology*, 30(2), 337–357, 1986, above a certain critical flow rate, the observed extrudate irregularities may be broadly classified into two main types: surface melt fracture and gross melt fracture.

Surface melt fracture occurs under apparently steady flow conditions and ranges in detail from loss of specular gloss to the more severe form of "sharkskin". In this disclosure, the onset of surface melt fracture is characterized at the beginning of losing extrudate gloss at which the surface roughness of extrudate can only be detected by 40×magnification. The critical shear rate at onset of surface melt fracture for the substantially linear ethylene polymers is at least 50 percent greater than the critical shear rate at the onset of surface melt fracture of a linear ethylene polymer having about the same I$_2$, $M_w/M_n$, and density. For the purposes of the instant application. "about the same" means that the $I_2$, $M_w/M_n$, and density values of both the substantially Linear ethylene polymer and the linear ethylene polymer to which it is compared is within 10 percent of each other. Preferably, the critical shear stress at onset of surface melt fracture for the substantially linear olefin polymers used in the invention is greater than $2.8 \times 10^6$ dynes/cm$^2$.

Gross melt fracture occurs at unsteady flow conditions and ranges in detail from regular (alternating rough and smooth, helical, etc.) to random distortions. For commercial acceptability, (e.g., in blown film products), surface defects should be minimal, if not absent. The critical shear rate at onset of surface melt fracture (OSMF) and critical shear stress at onset of gross melt fracture (OGMF) will be used herein based on the changes of surface roughness and configurations of the extrudates extruded by a GER. For the substantially linear olefin polymers used in the invention, the critical shear stress at onset of gross melt fracture is preferably greater than $4 \times 10^6$ dynes/cm$^2$.

The homogeneously branched linear or homogeneously branched substantially linear polymers useful in the present invention can be homopolymers of $C_2$–$C_{20}$ α-olefins, such as ethylene, propylene, 4-methyl-1-pentene, etc., or they can be interpolymers of ethylene with at least one $C_3$–$C_{20}$ α-olefin and/or $C_2$–$C_{20}$ acetylenically unsaturated monomer and/or $C_4$–$C_{18}$ diolefins. The substantially linear polymers of the present invention can also be interpolymers of ethylene with at least one of the above $C_3$–$C_{20}$ α-olefins, diolefins and/or acetylenically unsaturated monomers in combination with other unsaturated monomers. The term "interpolymer" means that the polymer has at least two comonomers (e.g., a copolymer) and also includes more than two comonomers (e.g., terpolymers). Substantially linear ethylene/alpha-olefin copolymers are preferred however, and ethylene/ $C_3$–$C_{20}$ α-olefin copolymers are especially preferred.

Suitable Blowing Agents

Foaming agents suitable for use in the gaskets disclosed herein include physical blowing agents which function as gas sources by going through a change of physical state. Volatile liquids produce gas by passing from the liquid to gaseous state, whereas compressed gases are dissolved under pressure in the melted polymer. Chemical blowing agents produce gas by a chemical reaction, either by a thermal decomposition or by a reaction between two components.

Suitable physical blowing agents include pentanes (e.g., n-pentane, 2-methylbutane, 2,2-dimethylpropane, 1-pentane and cyclopentane), hexanes (e.g., n-hexane, 2-methylpentane, 3-methylpentane, 2,3-dimethylbutane, 2,2-dimethylbutane, 1-hexene, cyclohexane), heptanes (e.g., n-heptane, 2-methylhexane, 2,2-dimethylpentane, 2,3-dimethylpentane, 2,4-dimethylpentane, 3,3-dimethylpentane, 3-ethylpentane, 2,2,3-trimethylbutane, 1-heptene), benzene, toluene, dichloromethane, trichloromethane, trichloroethylene, tetrachloromethane, 1,2-dichloroethane, trichlorofluoromethane, 1,1,2-trichlorotrifluoroethane, methanol, ethanol, 2-propanol, ethyl ether, isopropyl ether, acetone, methyl ethyl ketone, and methylene chloride.

Suitable gaseous blowing agents include carbon dioxide and nitrogen.

Suitable chemical blowing agents include sodium bicarbonate, dinitrosopentamethylenetetramine, sulfonyl hydrazides, azodicarbonamide (e.g., Celogen™ AZ 130 made by Uniroyal Chemical), p-toluenesulfonyl semicarbazide, 5-phenyltetrazole, diisopropylhydrazodicarboxylate, 5-phenyl-3,6-dihydro-1, 3,4-oxadiazin-2-one, and sodium borohydride.

The amount of blowing agent is dependent on the desired density reduction. One can calculate the amount of blowing agent required by knowing the volume of gas produced per gram of blowing agent at a given temperature and the desired density reduction (or target density) for a desired application. For chemical blowing agents the range is 0.1 to 4% by weight and more preferably 0.25 to 2% by weight. This range can also be adjusted by the addition of activation agents (sometimes referred to as coagents) such as (zinc oxide, zinc stearate). Preferably, the coagent is used in the formulation such that, e.g., the zinc oxide is used at a level of one and one-half to twice that of the blowing agent (e.g., azodicarbonamide).

Foams useful for making the gaskets claimed herein can be made as described in U.S. Pat. Nos. 5,288,762, 5,340, 840, 5,369,136, 5,387,620 and 5,407,965, the disclosures of each of which are incorporated herein by reference in their entirety.

Suitable Gasket Configurations

Gaskets can have many different forms, including "o-rings" and flat seals (e.g., "film-like" gaskets having a thickness commensurate with the intended use).

Suitable end uses include gaskets for metal and plastic closures, as well as other gasket applications. These applications include beverage cap liners, hot fill juice cap liners, polypropylene cap liners, steel or aluminum cap liners, high density polyethylene cap liners, window glass gaskets, sealed containers, closure caps, gaskets for medical devices, filter elements, pressure venting gaskets, hot melt gaskets, easy twist off caps, electrochemical cell gaskets, refrigerator gaskets, galvanic cell gaskets, leak proof cell gaskets, waterproofing sheet, reusable gaskets, synthetic cork like materials, thin cell electromembrane separator, magnetic rubber materials, disc gaskets for alcoholic beverage bottle caps, freeze resistant seal rings, gaskets for plastic castings, expansion joints and waterstops, corrosion-resistant conduit connectors, flexible magnetic plastics, pipe joint seals, integral weatherproof plastic lid and hinge for electrical outlets, magnetic faced foamed articles, jar rings, flexible gaskets, glass seals, tamper evident sealing liners, pressure applicators, combined bottle cap and straw structures, large condiment bottle liners, metal caps for applesauce or salsa jars, home canning jars, "crowns," and the like.

Gaskets made from the homogeneously branched linear or homogeneously branched substantially linear ethylene polymers have numerous advantages, especially when used in food-stuff applications. These include: improved taste and odor over incumbent polymer gaskets such as ethylene/vinyl acetate; low adhesion to polar substrates (e.g., polyethylene terephthalate, glass) which is useful for low torque removal of the closure/cap; low extractables (e.g., less than about 5.5% by weight) (also useful for food-stuffs, especially regarding regulatory compliance); good adhesion to non-polar substrates (e.g., polypropylene and high density polyethylene (either linear homopolymer polyethylene or linear heterogeneous high density polyethylene)).

Good adhesion in a cap or crown can be described as sufficiently adhering to the substrate. A liner exhibits this type adhesion when it can only be removed under a cohesive failure mode. Adhesion to metal (such as beer crowns) requires a lacquer that is both compatible with the polymer system and bonds to the metal (e.g., a lacquer such as AL 1296-01M sold by W. R. Grace). One such example that provides good adhesion is a modified polyester provided by Watson Standard (#40-207 or #40-542). Modified epoxy lacquers have also demonstrated good adhesion.

Additional benefits include adequate gas and water barrier properties; high melting point relative to incumbent polymers (e.g., ethylene/vinyl acetate); good stress crack resistance; good chemical resistance; variable hardness (useful for specific packaging which may require more or less gasket stiffness, depending on the degree of torque required to seal the container and the internal pressure of the container); and most importantly for the homogeneously branched substantially linear ethylene polymers, excellent processability achieved by uniquely controlling the melt flow ratio ($I_{10}/I_2$) independently of the molecular weight distribution ($M_w/M_n$). Substantially linear ethylene polymers having $M_w/M_n$ from about 1.5 to about 2.5, and $I_{10}/I_2$ ratios from about 7 to as high as about 20 are particularly useful in these gasketing applications.

Various gasket manufacturing techniques include those disclosed in U.S. Pat. No. 5,215,587 (McConnellogue et al.); U.S. Pat. No. 4,085,186 (Rainer); U.S. Pat. No. 4,619,848 (Knight et al.); U.S. Pat. No. 5,104,710 (Knight); U.S. Pat. No. 4,981,231 (Knight); U.S. Pat. No. 4,717,034 (Mumford); U.S. Pat. No. 3,786,954 (Shull); U.S. Pat. No. 3,779,965 (Lefforge et al.); U.S. Pat. No. 3,493,453 (Ceresa et al.); U.S. Pat. No. 3,183,144 (Caviglia); U.S. Pat. No. 3,300,072 (Caviglia); U.S. Pat. No. 4,984,703 (Burzynski); U.S. Pat. No. 3,414,938 (Caviglia); U.S. Pat. No. 4,939,859 (Bayer); U.S. Pat. No. 5,137,164 (Bayer); and U.S. Pat. No. 5,000,992 (Kelch). The disclosure of each of the preceding United States Patents is incorporated herein in its entirety by reference. Preferably, the gasket is made in a single step process by extruding a portion of the foaming substantially linear ethylene polymer and then immediately compression molding that portion into a gasket.

The one-step process used for forming and foaming gaskets disclosed herein is different from processes used for making gaskets by extruded sheets or films by conventional techniques as blown, cast or extrusion coated films, followed by stamping or cutting the gasket from the sheet or film since substantial waste is avoided and more control over gasket dimensions in 1-step process; another advantage of the 1-step process is achieving lower gasket thickness (e.g., from about 5 mils to about 50 mils). Preferably, the one step process for forming a gasket having a Shore A hardness from about 40 to about 95, comprising the steps of:

(a) combining at least one homogeneously branched linear or a homogeneously branched substantially linear ethylene polymer with at least one blowing agent to form a mixture, (b) extruding said mixture through an orifice, (c) cutting the extruded mixture into a pellet, (d) positioning the cut extruded mixture into a closure, and (e) compression shaping the positioned mixture in said closure.

More preferably, for closures having a 28 mm diameter, the cut pellet weighs from about 120 mg to about 300 mg.

Multilayer film structures are also suitable for making the gaskets disclosed herein, with the proviso that at least one layer (preferably the inner layer which is located adjacent to the product) comprises the homogeneously branched linear or homogeneously branched substantially linear ethylene polymer. Foam multilayer gaskets comprising the homogeneously branched linear or homogeneously branched substantially linear ethylene polymers are also useful in the present invention.

Examples 1–6 and Comparative Examples 1\*–10\*

Polymers 1 and 2 and comparison polymers 3–6 are tested for compression set at ambient temperature (about 25° C.) and at elevated temperature (about 60° C.). Polymers 1 and 2 are ethylene/1-octene substantially linear polyethylenes produced by the constrained geometry catalyst technology, as described in U.S. Pat. No. 5,272,236 and are tested with varying amounts of a blowing agent (Celogen™ AZNP made by Uniroyal Chemical). Polymer 1 has a melt index ($I_2$) of about 30 g/10 minutes, a density of about 0.903 g/cm³, a melt flow ratio, $I_{10}/I_2$, of about 7.1 and a molecular weight distribution, $M_w/M_n$, of about 2.04. Polymer 2 has a melt index ($I_2$) of about 30 g/10 minutes, a density of about 0.913 g/cm³, a melt flow ratio, $I_{10}/I_2$, of about 7.1 and a molecular weight distribution, $M_w/M_n$, of about 2.14.

The powdered blowing agent is incorporated into each of polymers 1 and 2 by preparing 20 pound lots of dry blends of the blowing agent with each polymer. The dry blends are prepared by preweighing and then adding the ingredients into a large bag and vigorously shaking the sample until a homogeneous blend is observed, usually after shaking about 3 minutes. In order to account for some small loss of the blowing agent on the sidewall of the bag, the blowing agent is added at levels of 110 percent of that targeted for a particular blend.

The foamed samples are prepared on a DEMAG injection molding machine at a melt temperature of about 410° F. (210° C.). Instead of injecting the shot into a mold, the shot is injected onto a piece of polyester film (e.g., Mylar™ made by E. I. Du Pont de Nemours & Company). The foam is then allowed to freely expand and cool to room temperature (about 25° C.).

Comparison polymer 3 is a heterogeneous linear low density polyethylene (LLDPE) having a melt index of 25.6 g/10 minutes, a density of about 0.918 g/cm³, a melt flow ratio, $I_{10}/I_2$, of about 7 and a molecular weight distribution, $M_w/M_n$, of about 2.9. Comparison polymer 4 is an ethylene/vinyl acetate copolymer made by E. I. Du Pont de Nemours & Company, and has about 11 percent vinyl acetate content. Comparison polymer 5 is an ethylene vinyl acetate copolymer trademarked Elvax™ 650, made by E. I. Du Pont de Nemours & Company, and has about 12 percent vinyl acetate content and a melt index of about 8 g/10 minutes and a density of about 0.933 g/cc. Comparison polymer 6 is a melt blend of plasticized polyvinylchloride (PVC) and a blowing agent as provided by a compounder. This material has about 35% plasticizer (di(2-ethylhexyl)phthalate), a density of about 1.19 g/cc and a shore A hardness of about 65. Comparison polymer 7 is a melt blend of PVC and blowing agent prepared by physically combining and extruding the materials.

Compression set is tested in accordance with ASTM D-395, method B, type 1 test specimens. Shore A is tested as described supra. Table 3 summarizes compression set and Shore A hardness data for polymers 1 and 2 and comparative polymers 3–7 with varying amounts of blowing agent incorporated:

TABLE 3

| Example (polymer used) | Percent blowing agent added to polymer | Compression Set at 25° C. (percent lost) | Compression Set at 60° C. (percent lost) | Shore A | Density (g/cc) | Density Reduction (%) |
|---|---|---|---|---|---|---|
| 1* (1)  | 0    | 30.0 | 71.5 | 94  | 0.903 | 0    |
| 1 (1)   | 0.25 | 18.2 | 66.1 | 89  | 0.493 | 45.4 |
| 2 (1)   | 0.5  | 17.6 | 65.6 | 60  | 0.411 | 54.5 |
| 3 (1)   | 1    | 14.8 | 65.1 | 45  | 0.317 | 64.9 |
| 2* (2)  | 0    | 30.3 | 69.5 | 96  | 0.913 | 0    |
| 4 (2)   | 0.25 | 28.8 | 65.6 | 92  | 0.561 | 38.6 |
| 5 (2)   | 0.5  | 24.0 | 59.2 | 75  | 0.358 | 60.8 |
| 6 (2)   | 1    | 21.4 | 64.4 | 75  | 0.321 | 64.8 |
| 3* (3)  | 0    | 32.9 | 72.3 | 95  | 0.918 | 0    |
| 4* (3)  | 0.25 | 32.3 | 70.9 | 92  | 0.581 | 43.6 |
| 5* (3)  | 0.5  | 32.3 | 68.3 | NM  | 0.359 | 60.9 |
| 6* (3)  | 1    | 31.9 | 67.9 | NM  | 0.339 | 63.1 |
| 7* (4)  | 0    | 26.5 | 76.3 | 94  | 0.943 | 0    |
| 8* (5)  | 0    | 38.4 | 75.2 | N/A | NM    | 0    |
| 9* (6)  | 1    | 30.3 | 65.8 | 70  | 1.191 | 0    |
| 10* (7) | 1    | 2.9  | 60   | NM  | 0.608 | 49.5 |

*Comparison Example Only; not an example of the invention
N/A = Not Applicable
NM = Not Measured The results indicate that there is a significant improvement in compression set and hardness of the homogeneous linear polyethylenes due to foaming. There is a significant decrease in the percentage loss for compression set and in the Shore A hardness. The resulting compression set and hardness properties are in some cases significantly better for the foamed homogeneous linear polyethylenes than for incumbent materials used in closure liner applications. Examples 1–3 and 4–6 exhibit lower ambient temperature compression set than comparative examples 1*–6*, and 8*. Examples 1–3 and 4–6 exhibit lower compression set at 60° C. than comparative examples 1*–8*. Examples 1–3 and 4–6 exhibit lower Shore A hardness than comparative examples 1*–4*, and 7*. Although not all of the comparison examples are foamed, the comparison is still valid because the requirements for applications are typically minimums or threshold value above or below which the materials need to be. Further, the most important comparison is between the foamed homogeneously branched substantially linear ethylene substantially linear ethylene polymers and unfoamed heterogeneously branched linear ethylene polymers and the foamed heterogeneously branched linear ethylene polymers samples.

We claim:

1. A foamed gasket made from a composition comprising at least one homogeneously branched ethylene polymer which is an interpolymer of ethylene with at least one $C_3$–$C_{20}$ alpha-olefin, and at least one blowing agent, wherein the polymer has a density of about 0.895 to about 0.915 g/cm$^3$, and is characterized as having a molecular weight distribution $M_w/M_n$ of from about 1.5 to about 2.5, and as having a CDBI greater than about 50%.

2. The foamed gasket of claim 1 wherein the ethylene polymer is characterized having:

a) a melt flow ratio, $I_{10}/I_2$, $\geq 5.63$, b) a molecular weight distribution, $M_w/M_n$, defined by the equation:

$$M_w/M_n \leq (I_{10}/I_2) - 4.63,$$

and c) a critical shear stress at onset of gross melt fracture greater than $4 \times 10^6$ dyne/cm$^2$.

3. The foamed gasket of claim 1, wherein the ethylene polymer is characterized as having:

a) a melt flow ratio, $I_{10}/I_2$, $\geq 5.63$, b) a molecular weight distribution, $M_w/M_n$, defined by the equation:

$$M_w/M_n \leq (I_{10}/I_2) - 4.63,$$

and c) a critical shear rate at onset of surface melt fracture at least 50 percent greater than the critical shear rate at the onset of surface melt fracture of a linear ethylene polymer having about the same $I_2$, density and $M_w/M_n$.

4. The foamed gasket of claims 2 or 3, wherein the ethylene ppolymer is a substantially linear ethylene polymer having from about 0.01 to about 3 long chain branches/1000 carbons along the polymer backbone.

5. The foamed gasket of claims 1, 2 or 3, wherein the blowing agent is selected from the group consisting of physical blowing agents, gaseous blowing agents and chemical blowing agents.

6. The foamed gasket of claims 1, 2 or 3, wherein the blowing agent is a chemical blowing agent selected from the group consisting of sodium bicarbonate, dinitrosopentamethylenetetramine, sulfonyl hydrazides, azodicarbonamide, p-toluenesulfonyl semicarbazide, 5-phenyltetrazole, diisopropylhydrazodicarboxylate, 5-phenyl-3,6-dihydro-1,3,4-oxadiazin-2-one, and sodium borohydride.

7. The foamed gasket of claims 1, 2 or 3, wherein the blowing agent is a gaseous blowing agent selected from the group consisting of carbon dioxide and nitrogen.

8. The foamed gasket of claims 1, 2 or 3, wherein the blowing agent is a physical blowing agent selected from the group consisting of pentanes, hexanes, heptanes, benzene, toluene, dichloromethane, trichloromethane, trichloroethylene, tetrachloromethane, 1,2-dichloroethane, trichlorofluoromethane, 1,1,2-trichlorotrifluoroethane, methanol, ethanol, 2-propanol, ethyl ether, isopropyl ether, acetone, methyl ethyl ketone, and methylene chloride; isobutane and n-butane, 1,1-difluoroethane.

* * * * *